Nov. 8, 1960

W. G. BOYLE 2,959,187

BALL-TYPE SURFACE SAFETY VALVE

Filed Aug. 18, 1958

INVENTOR.
WILLIAM G. BOYLE
BY
Mellin and Hanscom
ATTORNEYS

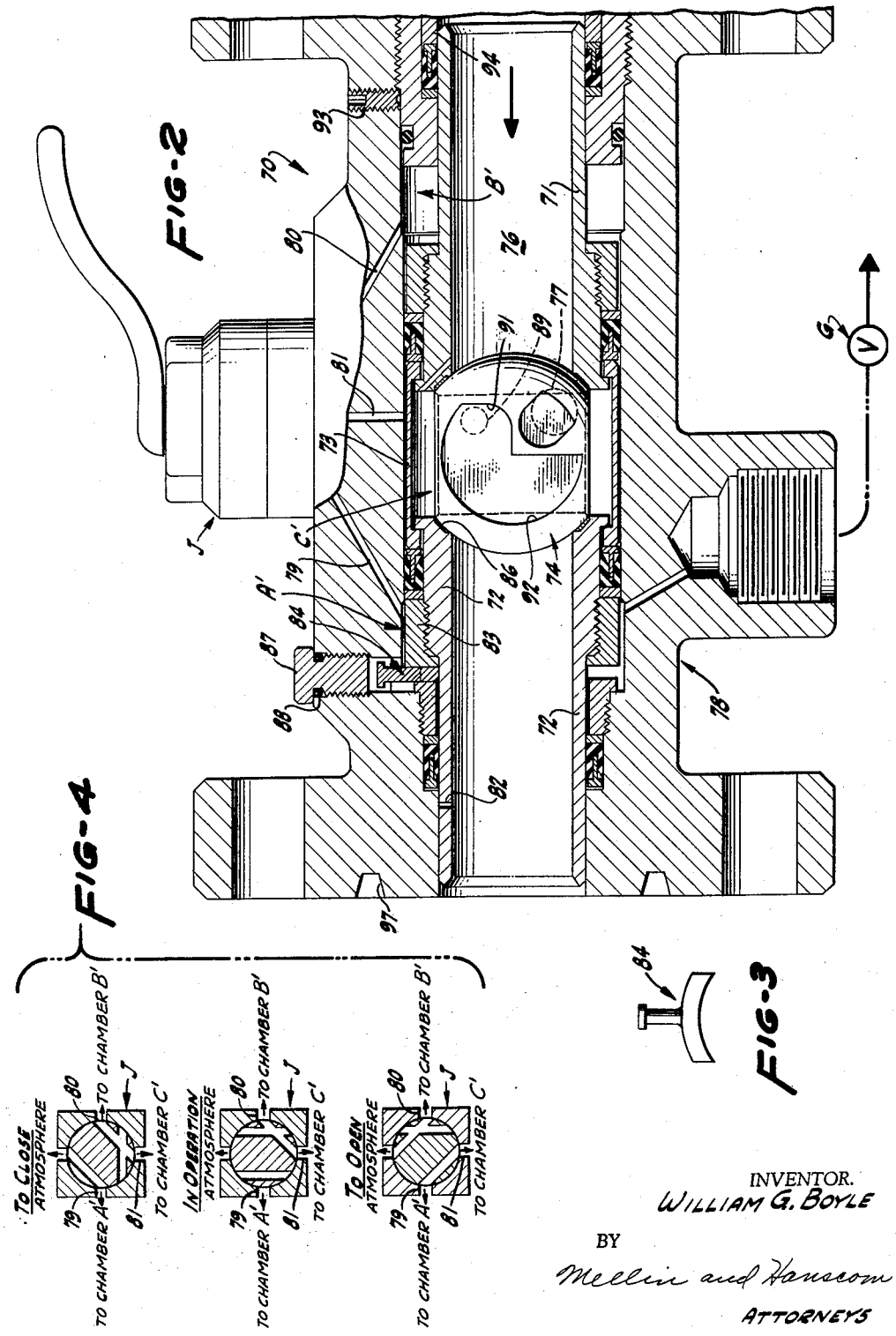

United States Patent Office 2,959,187
Patented Nov. 8, 1960

2,959,187

BALL-TYPE SURFACE SAFETY VALVE

William G. Boyle, Dallas, Tex., assignor to Otis Engineering Corporation, Dallas, Tex., a corporation of Texas Filed Aug. 18, 1958, Ser. No. 755,671

10 Claims. (Cl. 137—456)

This invention relates to valves, and more particularly to ball-type valves having a full bore opening therethrough.

This invention has been designed to provide a small, compact, smooth and straight bore valve for flowlines that is operated by the pressure within the flowline and which is designed to be closed automatically in the event that abnormal flowline pressures exist.

An object of the invention is to provide a valve having the above advantages and with a minimum outside diameter, weight and length by utilizing the geometric properties of a ball and annular piston.

Another object is to provide a valve for a well head flowline having a straight and relatively smooth bore, when open, to minimize collection therein of paraffin, sand and the like, and to minimize flow cutting of the valve, turbulence and pressure losses.

A further object is to provide a means for equalizing across the valve in the event a malfunction causes difficulty in opening the valve, and to relieve bearing stresses and friction forces when opening the valve.

Other objects and advantages will become apparent in the course of the following detailed description.

In the drawings, forming a part of this application, and in which like parts are designated by like reference numerals throughout the same, Fig. 1 is a longitudinal sectional view through a ball-type surface safety valve constructed in accordance with the invention.

Fig. 2 is a view similar to Fig. 1, illustrating a modification of the invention.

Fig. 3 is an elevational view of the stop plate used in the modification of Fig. 2.

Fig. 4 illustrates the porting arrangements of the manually operable valve used in the embodiment of Fig. 2.

Figure 1:
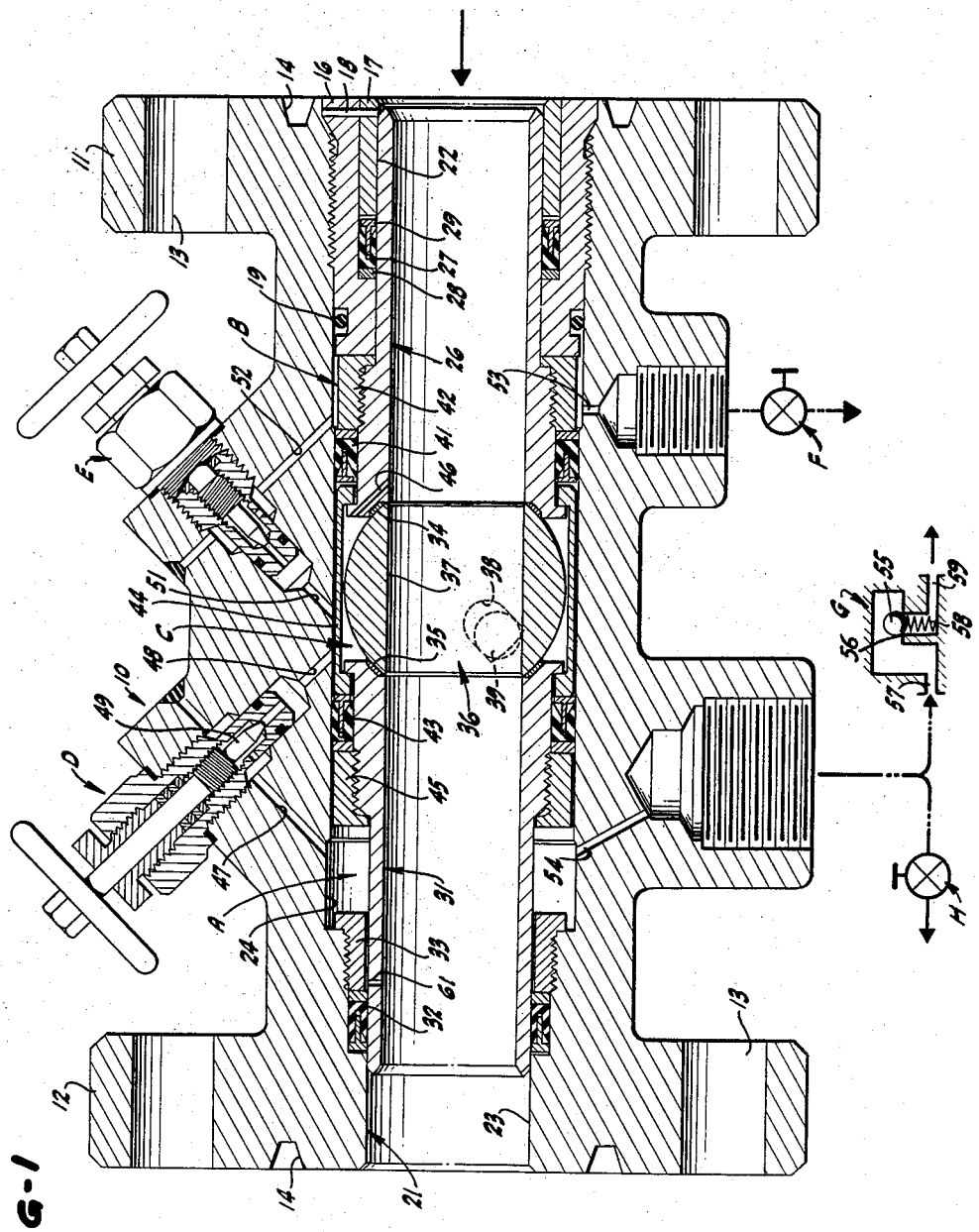

Referring now to the drawings, and particularly to the embodiment of Fig. 1, the valve comprises a valve body 10 having upstream and downstream flanges 11 and 12, respectively, with bolt holes 13 therethrough for attachment into a flowline. The end faces of the valve body are provided with annular packing recesses 14. Annular nut 16 and packing sleeve 17, held together by roll pin 18, are threaded into the upstream end of body 10 and are sealed thereto by O-ring 19. Thus the valve body has a straight axial bore 21 therethrough having restricted diameter upstream and downstream ends 22 and 23 separated by an enlarged diameter mid-portion 24.

An upstream, tubular valve seat member 26 is mounted for longitudinal sliding movement in the restricted bore end 22 and projects into the mid-portion 24 of the bore. A packing ring 27, disposed between back-up rings 28 and 29, seals between the valve seat member 26 and nut 16. Similarly, a downstream tubular valve seat member 31 is longitudinally slidably disposed in the restricted bore end 23 and is sealed thereto by packing 32. Packing nut 33 retains packing 32 in place. Valve seat members 26 and 31 are provided with oppositely facing annular segmented-sphere valve seats 34 and 35, respectively.

A ball valve member 36 is disposed between the valve seat members 26 and 31 and has an opening 37 therethrough of a diameter equal to the internal diameters of the valve seat members 26 and 31. The ball valve has cam slots 38 formed therein on opposite sides thereof into which cam lugs 39 formed on valve body 10 project. Thus, if the ball valve member 36 is moved bodily downstream in bore 21 from the open position shown in Fig. 1, the interengagement of the valve member cam slots and the stationary valve body lugs 38 and 39 will cause the ball valve to rotate about an axis transverse to the opening 37 therethrough to move the ball valve to closed position, as shown in Fig. 2.

The upstream valve seat member 26 carries an external packing member 41 thereon to seal against the mid-portion 24 of the bore, which packing member may be referred to as an annular external flange on the valve seat member 26 in sliding engagement with the bore. Packing nut 42 retains the packing member 41 in place on the seat member. Similarly, the downstream valve seat member 31 has an annular external packing member 43 thereon to slidably seal the downstream seat member to the mid-portion 24 of the valve body bore. The packing member 43 is held in place by packing nut 45.

A tubular sleeve 44 loosely engages the opposed ends of the valve seat members 26 and 31 for unitary longitudinal movement thereof. Since there is no seal between the sleeve 44 and the valve seat members 26 and 31, fluid may pass therebetween.

With the foregoing construction, the annular space between the bore mid-portion 24 and the valve seat members 26 and 31 and ball valve member 37 is divided by the valve seat packing members 41 and 43 into a downstream annular variable-capacity chamber A, an upstream annular variable-capacity chamber B, and an annular central chamber C.

The sleeve member 44, as has been pointed out above, loosely couples the valve seat members 26 and 31, and is not sealed thereto, so that fluid communication is provided between the main bore 21 and the central chamber C in order that the fluid pressure in chamber C will be substantially equal to the fluid pressure in the main bore. If desired or necessary, a passage 46 can be provided through the upstream valve seat member 26 for this purpose, or a passage can be drilled through the upstream side of the ball valve member 37 to provide such fluid communication.

Chambers A and C are adapted to be placed in fluid communication by passages 47 and 48 which communicate with opposite sides of the valve member 49 of needle valve D. Similarly, needle valve E controls fluid flow through passages 51 and 52 from chamber C to chamber B.

Chamber B can be vented to atmosphere by means of passage 53 to which a suitable manually operable needle valve F may be attached. Similarly, passage 54 leads from chamber A and connects to a pressure responsive pilot valve G which enables chamber A to be vented to atmosphere.

Valve G may be any conventional type of valve used for such purpose, and has been illustrated diagrammatically as a valve wherein a ball 55 is adapted to be held against seat 56 by the fluid pressure entering inlet 57. When the fluid pressure drops sufficiently, spring 58 will unseat the ball, allowing fluid to pass out freely through outlet passage 59 to atmosphere. Thus, whenever the fluid pressure within chamber A drops below a value predetermined by the spring force of spring 58, chamber A will be fully vented to atmosphere. If desired, a low pressure pilot valve such as that designated by the reference letter "A" in the Otis Patent No. 2,566,772 may be used for this purpose. Further, if desired, a high pressure pilot valve may be employed if it is desired to vent chamber A to atmosphere upon the pressure therein reaching a predetermined high amount. Any conventional high pressure pilot valve may be used for this latter purpose, as, for example, a valve such as that designated by the reference letter "B" in the above mentioned Patent No. 2,566,772.

In the following discussion of the operation of the valve, the activating pressure differential which causes movement of the valve assembly is the pressure differential between either of chambers A or B and chamber C. For example, when the pressures in chambers A and C are equal to line pressure and chamber B is at atmospheric pressure, then the pressure differential between chambers C and B will actuate the valve assembly. Similarly, if chambers B and C are at the same pressure and the pressure in chamber A is at a lower pressure, then the pressure differential between chambers A and C will cause the valve assembly to be actuated.

In operation, the safety valve 10 is connected in a flowline, as, for example, a flowline from an oil well head, with the flange 11 connected upstream in the line. The fluid pressure in the main bore 21 will be present in chamber C at all times, whether the ball valve member is in open position (Fig. 1) or in closed position (Fig. 2). If it is desired to move the ball valve member to an open position shown in Fig. 1, valve D is opened to equalize the pressures in chambers A and C. Valve E is closed and valve F is opened to vent chamber B to atmosphere. The fluid pressure within chamber C then forces the valve seat member 26 upstream. The connecting sleeve 44 pulls the valve seat member 31 upstream, which caused ball valve member 37 to move upstream. As the ball valve member moves upstream, the interengagement between the stationary body lugs 39 and the ball valve cam slots 38 causes the ball valve to rotate about an axis transverse to the opening 37 therethrough, so that the opening 37 becomes aligned with the bores of the valve seat members 26 and 31, as illustrated in Fig. 1.

With the ball valve now in open position, the valve F is closed and valve E is opened, to put line pressure into chamber B. Valve D is then closed, but a small bleed hole 61 in the downstream end of valve seat member 31 maintains chamber A at line pressure, to avoid accidental closing of the ball valve.

The ball valve will remain open as long as the flowline pressure remains above the spring setting of the pilot valve G. In the event that the flowline pressure falls below this amount, valve G will open and will vent chamber A to atmosphere. The bleed port 61 in valve seat member 31 is quite small relative to passage 54 so that the pressure in chamber A will drop substantially to atmospheric pressure. The imbalance in pressures in chambers A and C forces the valve seat member 31 downstream, and, in turn, the connecting sleeve member 44 pulls the upstream valve seat member 26 therewith to move the ball valve downstream. This movement causes the ball valve to rotate about the valve body lugs 39 to closed position. The pressure within the valve body bore upstream of the ball valve causes the ball valve to seat tightly against valve seat 35 so as to prevent fluid flow through the valve until again opened. The valve member seat port 61 will have moved downstream of packing 32 so that chamber A will be completely sealed from the main bore 21.

If desired, a manually operable valve H may be used to vent chamber A to atmosphere in order to be able to close the ball valve manually.

Referring now to the embodiment of the invention shown in Fig. 2, the safety valve 70 illustrated therein is generally identical in its operating parts to the valve of Fig. 1, wherein the upstream and downstream valve seat members 71 and 72 are loosely coupled by connecting sleeve 73 to move the ball valve member 74 longitudinally in main bore 76 and to rotate the ball valve about the cam lugs 77 fixed to the valve body 78.

The variable capacity downstream and upstream chambers A' and B' and the central chamber C' are connected by fluid passages 79, 80 and 81, respectively, to a conventional manually-operable shear-seal type valve J, the porting arrangement of which is shown in Fig. 4. When the valve J is turned to the "To Close" position, chambers B' and C' are in fluid communication and chamber A' is vented to atmosphere. The pressure differential between chambers A' and C' thus causes the downstream valve seat member 72 to move downstream, pulling the upstream valve seat member 71 and ball valve member 74 therewith, so as to rotate the ball valve to the closed position illustrated in Fig. 2. The upstream line pressure holds the ball valve tightly against the valve seat member 72 to prevent fluid flow therepast.

When valve J is turned to the "To Open" position, chambers A' and C' are put into fluid communication and chamber B' is vented to atmosphere. This causes the interconnected valve seat members 71 and 72 to move upstream to rotate the ball valve to open position.

After the ball valve is opened, valve J is turned to the "In Operation" position of Fig. 5. Chambers B' and C' are now in fluid communication and the chamber A' passage 79 is sealed. Again, the line pressure will exist in chamber A' by means of the small bleed passage 82. Chamber A' is again connected to a low pressure pilot valve G, and if the line pressure drops below the value for which valve G is set, this valve will open to vent chamber A' to atmosphere. The pressure imbalance between chambers A' and C' will cause the valve seat members 71 and 72 to move downstream to close the ball valve 74.

Thus, by means of the single manually operable valve J, it is possible to open and close the ball valve when desired as well as providing for the pilot controlled closing in the event of abnormal line pressure conditions. As before, the motive force for the actual opening and closing of the ball valve is supplied by the pressure of the fluid within valve 70.

This embodiment of the invention also provides for pressure equalization across the ball valve 75 if such is desired, or necessary, in the opening of the valve. When in the closed position, the downstream movement of valve seat member 72 is limited by the abutment of the packing nut 83 thereof with the stop plate 84. In this position, the ball valve is held sealed against the valve seat 86 by the upstream fluid pressure.

Before opening of the valve, the stop plate screw 87 (normally sealed to the valve body 78 by O-ring 88) is unscrewed, causing the stop plate 84 to be moved upwardly out of the path of downstream movement of the valve seat member 72. The assembly of the two valve seat members 71 and 72 and the ball valve 74 moves slightly downstream until the fixed body member lug 89 engages the shoulder 91 of the slot 92 formed in the exterior of the ball valve member to prevent further downstream movement of the ball valve. The valve seat member 72, however, is still free to move slightly further downstream to break the seal between itself and the ball valve. With this seal broken, the pressures on both sides of the ball valve will equalize, enabling the ball valve to be easily moved to open position, as described above.

A setscrew 93 is added to this embodiment to serve as a lock for the nut 94.

As is apparent from the above disclosure, a full opening surface safety valve has been provided which has minimum size in relation to the diameter of the flowline and which utilizes the fluid pressure within the flowline for opening and closing the valve. Furthermore, the valve is adapted to close automatically in response to abnormal pressure conditions within the flowline.

It is to be realized that the forms of the invention herewith shown and described are to be taken as preferred embodiments of the same and that various changes in the shape, size and arrangement of parts may be resorted to without departing from the spirit of the invention or the scope of the attached claims.

Having thus described my invention, what I claim and desire to secure by Letters Patent is:

1. A ball-type surface safety valve comprising a valve body provided with a straight bore therethrough having upstream and downstream restricted diameter end portions on either side of an enlarged diameter mid-portion, a pair of upstream and downstream oppositely-facing and spaced apart tubular valve seat members each longitudinally slidable in one of said bore end portions and projecting into said enlarged bore mid-portion, a ball valve member having an opening therethrough and seatable between said seats for opening and closing said bore upon the rotation thereof about an axis transverse to the opening therethrough, interengaging cam slots on one and cam lugs on the other of the opposite sides of said ball valve member and the valve body for causing rotation of said ball valve member to closed position upon downstream longitudinal movement thereof in said bore and to open position upon upstream longitudinal movement thereof in said bore, connecting means coupling said valve seat members loosely to said ball valve member for unitary longitudinal movement thereof within said bore, an external annular flange formed on each of said valve seat members slidably engaging said enlarged bore mid-portion to form between the enlarged bore mid-portion and the valve seat members upstream and downstream variable capacity chambers separated by a central chamber, means providing fluid communication from said bore to said central chamber at all times, manually operable means to selectively connect one of said variable capacity chambers to said central chamber, and means to selectively vent the other of said variable capacity chambers to atmosphere.

2. A ball-type surface safety valve comprising a valve body provided with a straight bore therethrough having upstream and downstream restricted diameter end portions on either side of an enlarged diameter mid-portion, a pair of upstream and downstream oppositely facing and spaced apart tubular valve seat members each longitudinally slidable in one of said bore end portions and projecting into said enlarged bore mid-portion, a ball valve member having an opening therethrough and seatable between said seats for opening and closing said bore upon the rotation thereof about an axis transverse to the opening therethrough, interengaging cam slots on one and cam lugs on the other of the opposite sides of said ball valve member and the valve body for causing rotation of said ball valve member to closed position upon downstream longitudinal movement thereof in said bore and to open position upon upstream longitudinal movement thereof in said bore, connecting means loosely coupling said valve seat members for unitary longitudinal movement within said bore, an external annular flange formed on each of said valve seat members slidably engaging said enlarged bore mid-portion to form between the enlarged bore mid-portion and the valve seat members upstream and downstream variable capacity chambers separated by a central chamber, means providing fluid communication from said bore to said central chamber at all times, means to fluidly connect said upstream chamber to said central chamber, and means responsive to a predetermined pressure within said valve body to vent said downstream chamber to atmosphere upon the presence of said predetermined pressure.

3. A ball-type surface safety valve comprising a valve body provided with a straight bore therethrough having upstream and downstream restricted diameter end portions on either side of an enlarged diameter mid-portion, a pair of upstream and downstream oppositely facing and spaced apart tubular valve seat members each longitudinally slidable in one of said bore end portions and projecting into said enlarged bore mid-portion, a ball valve member having an opening therethrough and seatable between said seats for opening and closing said bore upon the rotation thereof about an axis transverse to the opening therethrough, interengaging cam slots on one and cam lugs on the other of the opposite sides of said ball valve member and the valve body for causing rotation of said ball valve member to closed position upon downstream longitudinal movement thereof in said bore and to open position upon upstream longitudinal movement thereof in said bore, connecting means coupling said valve seat members loosely to said ball valve member for unitary longitudinal movement thereof within said bore, an external annular flange formed on each of said valve seat members slidably engaging said enlarged bore mid-portion to form between the enlarged bore mid-portion and the valve seat members upstream and downstream variable capacity chambers separated by a central chamber, means providing fluid communication from said bore to said central chamber at all times, manually operable means to selectively connect one of said variable capacity chambers to said central chamber, manually operable means to connect the upstream chamber to atmosphere, and means responsive to a predetermined pressure within said valve body to connect said downstream chamber to atmosphere upon the occurrence of said predetermined pressure.

4. A ball-type surface safety valve comprising a valve body provided with a straight bore therethrough having upstream and downstream restricted diameter end portions on either side of an enlarged diameter mid-portion, a pair of upstream and downstream oppositely facing and spaced apart tubular valve seat members each longitudinally slidable in one of said bore end portions and projecting into said enlarged bore mid-portion, a ball valve member having an opening therethrough and seatable between said seats for opening and closing said bore upon the rotation thereof about an axis transverse to the opening therethrough, interengaging cam slots on one and cam lugs on the other of the opposite sides of said ball valve member and the valve body for causing rotation of said ball valve member to closed position upon downstream longitudinal movement thereof in said bore and to open position upon upstream longitudinal movement thereof in said bore, connecting means coupling said valve seat members loosely to said ball valve member for unitary longitudinal movement thereof within said bore, an external annular flange formed on each of said valve seat members slidably engaging said enlarged bore mid-portion to form between the enlarged bore mid-portion and the valve seat members upstream and downstream variable capacity chambers separated by a central chamber, means providing fluid communication from said bore to said central chamber at all times, means including a manually operable valve having first and second positions for fluidly connecting said downstream chamber to said central chamber and for venting said upstream chamber to atmosphere when said valve is in its first position and for fluidly connecting said upstream chamber to said central chamber when said valve is in its second position, and means including a valve responsive to a predetermined pressure within said valve body for venting said downstream chamber to atmosphere upon the presence of said predetermined pressure.

5. A ball-type surface safety valve comprising a valve body provided with a straight bore therethrough having upstream and downstream restricted diameter end portions on either side of an enlarged diameter mid-portion, a pair of upstream and downstream oppositely facing and spaced apart tubular valve seat members each longitudinally slidable in one of said bore end portions and projecting into said enlarged bore mid-portion, a ball valve member having an opening therethrough and seatable between said seats for opening and closing said bore upon the rotation thereof about an axis transverse to the opening therethrough, interengaging cam slots on one and cam lugs on the other of the opposite sides of said ball valve member and the valve body for causing rotation of said ball valve member to closed position upon downstream longitudinal movement thereof in said bore and to open position upon upstream longitudinal movement thereof in said bore, connecting means loosely coupling said valve seat members for unitary longitudinal movement within said bore, an external annular flange formed on each of said valve seat members slidably engaging said enlarged bore mid-portion to form between the enlarged bore mid-portion and the valve seat members upstream and downstream variable capacity chambers separated by a central chamber, means providing fluid communication from said bore to said central chamber at all times, means including a manually operable valve having first and second positions for fluidly connecting said downstream chamber to said central chamber and for venting said upstream chamber to atmosphere when said valve is in its first position and for fluidly connecting said upstream chamber to said central chamber when said valve is in its second position, and means including a valve responsive to a predetermined pressure within said valve body for venting said downstream chamber to atmosphere upon the presence of said predetermined pressure, said manually operable valve having a third position wherein said upstream chamber is fluidly connected to said central chamber and said downstream chamber is vented to atmosphere for causing said ball valve member to close.

6. A ball-type surface safety valve comprising a valve body provided with a straight bore therethrough having upstream and downstream restricted diameter end portions on either side of an enlarged diameter mid-portion, a pair of upstream and downstream oppositely facing and spaced apart tubular valve seat members each longitudinally slidable in one of said bore end portions and projecting into said enlarged bore mid-portion, a ball valve member having an opening therethrough and seatable between said seats for opening and closing said bore upon the rotation thereof about an axis transverse to the opening therethrough, interengaging cam slots on one and cam lugs on the other of the opposite sides of said ball valve member and the valve body for causing rotation of said ball valve member to closed position upon downstream longitudinal movement thereof in said bore and to open position upon upstream longitudinal movement thereof in said bore, connecting means loosely coupling said valve seat members for unitary longitudinal movement within said bore, an external annular flange formed on each of said valve seat members slidably engaging said enlarged bore mid-portion to form between the enlarged bore mid-portion and the valve seat members upstream and downstream variable capacity chambers separated by a central chamber, a restricted bleed passage formed through said downstream valve seat member into the downstream end of the downstream chamber when said downstream seat member is in its upstream position, means providing fluid communication from said bore to said central chamber at all times, means to fluidly connect said upstream chamber to said central chamber, and means responsive to a predetermined pressure within said valve body to vent said downstream chamber to atmosphere upon the presence of said predetermined pressure.

7. A ball-type surface safety valve comprising a valve body provided with a straight bore therethrough having upstream and downstream restricted diameter end portions on either side of an enlarged diameter mid-portion, a pair of upstream and downstream oppositely facing and spaced apart tubular valve seat members each longitudinally slidable in one of said bore end portions and projecting into said enlarged bore mid-portion, a ball valve member having an opening therethrough and seatable between said seats for opening and closing said bore upon the rotation thereof about an axis transverse to the opening therethrough, interengaging cam slots on one and cam lugs on the other of the opposite sides of said ball valve member and the valve body for causing rotation of said ball valve member to closed position upon downstream longitudinal movement thereof in said bore and to open position upon upstream longitudinal movement thereof in said bore, connecting means loosely coupling said valve seat members for unitary longitudinal movement within said bore, an external annular flange formed on each of said valve seat members slidably engaging said enlarged bore mid-portion to form between the enlarged bore mid-portion and the valve seat members upstream and downstream variable capacity chambers separated by a central chamber, a restricted bleed passage formed through said downstream valve seat member into the downstream end of the downstream chamber when said downstream seat member is in its upstream position only, means providing fluid communication from said bore to said central chamber at all times, means including a manually operable valve having first and second positions for fluidly connecting said downstream chamber to said central chamber and for venting said upstream chamber to atmosphere when said valve is in its first position and for fluidly connecting said upstream chamber to said central chamber when said valve is in its second position, and means including a valve responsive to a predetermined pressure within said valve body for venting said downstream chamber to atmosphere upon the presence of said predetermined pressure.

8. A ball-type surface safety valve comprising a valve body provided with a straight bore therethrough having upstream and downstream restricted diameter end portions on either side of an enlarged diameter mid-portion, a pair of upstream and downstream oppositely facing and spaced apart tubular valve seat members each longitudinally slidable in one of said bore end portions and projecting into said enlarged bore mid-portion, a ball valve member having an opening therethrough and seatable between said seats for opening and closing said bore upon the rotation thereof about an axis transverse to the opening therethrough, interengaging cam slots on one and cam lugs on the other of the opposite sides of said ball valve member and the valve body for causing rotation of said ball valve member to closed position upon downstream longitudinal movement thereof in said bore and to open position upon upstream longitudinal movement thereof in said bore, connecting means loosely coupling said valve seat members for unitary longitudinal movement within said bore, an external annular flange formed on each of said valve seat members slidably engaging said enlarged bore mid-portion to form between the enlarged bore mid-portion and the valve seat members upstream and downstream variable capacity chambers separated by a central chamber, means providing fluid communication from said bore to said central chamber at all times, manually operable means to selectively connect one of said variable capacity chambers to said central chamber, means to selectively vent the other of said variable capacity chambers to atmosphere, a removable stop member mounted in said valve body and engageable by said downstream valve seat member to limit downstream movement of said downstream valve seat and to permit additional downstream movement thereof when removed from engagement therewith, and interengaging slot means on one and lug means on the other of said valve body and ball valve member for stopping downstream movement of said ball valve member in said bore when said stop member is removed from engagement with said downstream valve seat member so that the downstream seat member and said ball valve member may be slightly separated to equalize pressure across said ball valve member.

9. A ball-type surface safety valve comprising a valve body provided with a straight bore therethrough having upstream and downstream restricted diameter end portions on either side of an enlarged diameter mid-portion, a pair of upstream and downstream oppositely facing and spaced apart tubular valve seat members each longitudinally slidable in one of said bore end portions and projecting into said enlarged bore mid-portion, a ball valve member having an opening therethrough and seatable between said seats for opening and closing said bore upon the rotation thereof about an axis transverse to the opening therethrough, interengaging cam slots on one and cam lugs on the other of the opposite sides of said ball valve member and the valve body for causing rotation of said ball valve member to closed position upon downstream longitudinal movement thereof in said bore and to open position upon upstream longitudinal movement thereof in said bore, connecting means loosely coupling said valve seat members for unitary longitudinal movement within said bore, an external annular flange formed on each of said valve seat members slidably engaging said enlarged bore mid-portion to form between the enlarged bore mid-portion and the valve seat members upstream and downstream variable capacity chambers separated by a central chamber, means providing fluid communication from said bore to said central chamber at all times, means including a manually operable valve having first and second positions for fluidly connecting said downstream chamber to said central chamber and for venting said upstream chamber to atmosphere when said valve is in its first position and for fluidly connecting said upstream chamber to said central chamber when said valve is in its second position, means including a valve responsive to a predetermined pressure within said valve body for venting said downstream chamber to atmosphere upon the presence of said predetermined pressure, a removable stop member mounted in said valve body and engageable by said downstream valve seat member to limit downstream movement of said downstream valve seat and to permit additional downstream movement thereof when removed from engagement therewith, and interengaging slot means on one and lug means on the other of said valve body and ball valve member for stopping downstream movement of said ball valve member in said bore when said stop member is removed from engagement with said downstream valve seat member so that the downstream seat member and said ball valve member may be slightly separated to equalize pressure across said ball valve member.

10. A ball-type surface safety valve comprising a valve body provided with a straight bore therethrough having upstream and downstream restricted diameter end portions on either side of an enlarged diameter mid-portion, a pair of upstream and downstream oppositely facing and spaced apart tubular valve seat members each longitudinally slidable in one of said bore end portions and projecting into said enlarged bore mid-portion, a ball valve member having an opening therethrough and seatable between said seats for opening and closing said bore upon the rotation thereof about an axis transverse to the opening therethrough, interengaging cam slots on one and cam lugs on the other of the opposite sides of said ball valve member and the valve body for causing rotation of said ball valve member to closed position upon downstream longitudinal movement thereof in said bore and to open position upon upstream longitudinal movement thereof in said bore, connecting means loosely coupling said valve seat members for unitary longitudinal movement within said bore, an external annular flange formed on each of said valve seat members slidably engaging said enlarged bore mid-portion to form between the enlarged bore mid-portion and the valve seat members upstream and downstream variable capacity chambers separated by a central chamber, a restricted bleed passage formed through said downstream valve seat member into the downstream end of the downstream chamber when said downstream seat member is in its upstream position, means providing fluid communication from said bore to said central chamber at all times, manually operable means to selectively connect one of said variable capacity chambers to said central chamber, means to selectively vent the other of said variable capacity chambers to atmosphere, a removable stop member mounted in said valve body and engageable by said downstream valve seat member to limit downstream movement of said downstream valve seat and to permit additional downstream movement thereof when removed from engagement therewith, and interengaging slot means on one and lug means on the other of said valve body and ball valve member for stopping downstream movement of said ball valve member in said bore when said stop member is removed from engagement with said downstream valve seat member so that the downstream seat member and said ball valve member may be slightly separated to equalize pressure across said ball valve member.

References Cited in the file of this patent

UNITED STATES PATENTS

| | | |
|---|---|---|
| 2,676,611 | Page | Apr. 27, 1954 |
| 2,708,563 | Backman | May 17, 1955 |
| 2,786,535 | Boer | Mar. 26, 1957 |

FOREIGN PATENTS

| | | |
|---|---|---|
| 762,219 | Great Britain | Nov. 28, 1956 |